US012433635B2

(12) United States Patent
Monfaredi et al.

(10) Patent No.: US 12,433,635 B2
(45) Date of Patent: Oct. 7, 2025

(54) SYSTEM, METHOD, AND DEVICE FOR PERFORMING ARTHROGRAPHY

(71) Applicant: CHILDREN'S NATIONAL MEDICAL CENTER, Washington, DC (US)

(72) Inventors: Reza Monfaredi, Washington, DC (US); Pavel S. Yarmolenko, Washington, DC (US); Karun Sharma, Washington, DC (US); Kevin Cleary, Washington, DC (US)

(73) Assignee: CHILDREN'S NATIONAL MEDICAL CENTER, Washington, DC (US)

(*) Notice: Subject to any disclaimer, the term of this patent is extended or adjusted under 35 U.S.C. 154(b) by 349 days.

(21) Appl. No.: 17/640,750

(22) PCT Filed: Sep. 4, 2020

(86) PCT No.: PCT/US2020/049491
§ 371 (c)(1),
(2) Date: Mar. 4, 2022

(87) PCT Pub. No.: WO2021/046411
PCT Pub. Date: Mar. 11, 2021

(65) Prior Publication Data
US 2022/0346830 A1   Nov. 3, 2022

Related U.S. Application Data

(60) Provisional application No. 62/896,431, filed on Sep. 5, 2019.

(51) Int. Cl.
*A61B 17/34* (2006.01)
*A61B 90/50* (2016.01)
(Continued)

(52) U.S. Cl.
CPC .......... *A61B 17/3403* (2013.01); *A61B 90/50* (2016.02); *A61B 2034/107* (2016.02); *A61B 2090/374* (2016.02)

(58) Field of Classification Search
CPC ...... A61B 17/3403; A61B 2017/00707; A61B 2017/00911; A61B 2017/3405;
(Continued)

(56) References Cited

U.S. PATENT DOCUMENTS

2005/0004581 A1   1/2005   Astrom
2008/0195109 A1   8/2008   Hunter et al.
(Continued)

FOREIGN PATENT DOCUMENTS

WO   WO 2007/064739 A2   6/2007
WO   WO 2011/047517 A1   4/2011
(Continued)

OTHER PUBLICATIONS

International Search Report and Written Opinion issued Feb. 12, 2011 in PCT/US2020/049491 filed on Sep. 4, 2020, (13 pages).
(Continued)

*Primary Examiner* — Michael T Rozanski
(74) *Attorney, Agent, or Firm* — Oblon, McClelland, Maier &Neustadt, L.L.P.

(57) ABSTRACT

In an embodiment, the present disclosure relates to a system for performing arthrography, comprising a physical grid positioned on skin of a patient proximate a region of interest of a joint on which the arthrography is to be performed, and processing circuitry configured to receive medical images of the patient, the received medical images being acquired by a same imaging modality and having visible a portion of the physical grid, determine a trajectory between an entry point identified on the physical grid and a target point identified within the region of interest of the joint, and generate a target
(Continued)

entry angle based on the determined trajectory between the identified entry point and the identified target point, wherein a needle guide device, configured to releasably-hold a needle, is positionable according to the identified entry point and the target entry angle.

19 Claims, 17 Drawing Sheets

(51) Int. Cl.
*A61B 34/10* (2016.01)
*A61B 90/00* (2016.01)

(58) Field of Classification Search
CPC ...... A61B 2017/3411; A61B 2034/107; A61B 2090/374; A61B 2090/376; A61B 2090/3954; A61B 2090/3983; A61B 2090/508; A61B 90/50
See application file for complete search history.

(56) References Cited

U.S. PATENT DOCUMENTS

| | | |
|---|---|---|
| 2012/0238864 A1 | 9/2012 | Piferi et al. |
| 2014/0371584 A1 | 12/2014 | Cleary et al. |
| 2015/0223906 A1 | 8/2015 | O'Neill et al. |
| 2017/0020623 A1 | 1/2017 | Glossop |
| 2020/0405399 A1* | 12/2020 | Steinberg ............... G06N 20/00 |

FOREIGN PATENT DOCUMENTS

| | | |
|---|---|---|
| WO | WO 2018/194800 A1 | 10/2018 |
| WO | WO 2019/012520 A1 | 1/2019 |

OTHER PUBLICATIONS

Li et al. Template for MR visualization and needle targeting. Nov. 28, 2018 (Nov. 28, 2018), (retrieved on Nov. 5, 2020). Retrieved from the Internet: <URL:https://www.ncbi.nlm.nlh.gov/pmc/articles/PMC6570497/>, pp. 1-20.

Reed et al. "Integrated Planning and Image-Guided Control for Planar Needle Steering", Proceedings of the 2nd Biennial IEEE/RAS-EMBS International Conference on Biomedical Robotics and Biomechatronics, Oct. 22, 2008 (Oct. 22, 2008). [retrieved on Nov. 5, 2020). Retrieved from the Internet: <URL: https://limbs.Icsr.jhu.edu/wp-contenVuploads/2013/05/Reedintegrated2008.pdf>, pp. 819-824.

Extended European Search Report issued Aug. 1, 2023 in European Patent Application No. 20860075.9 9 pages.

* cited by examiner

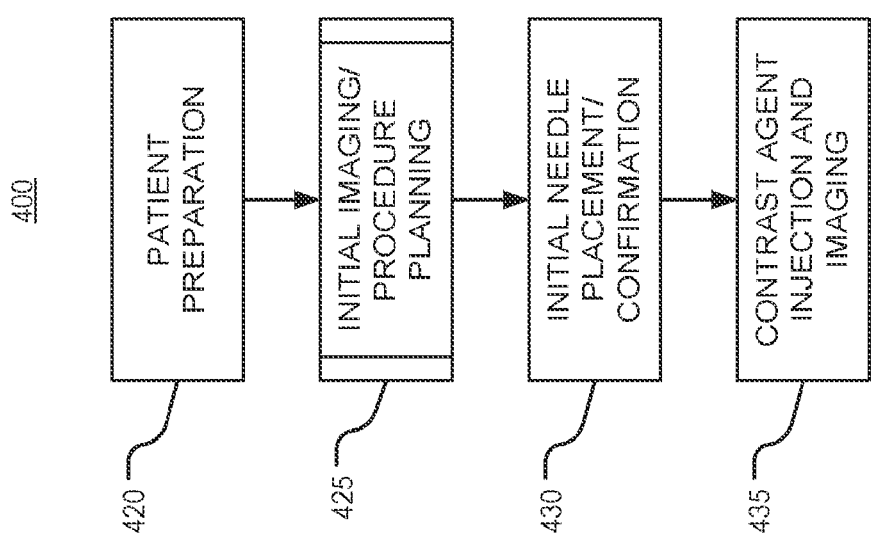

SYSTEM, METHOD, AND DEVICE FOR PERFORMING ARTHROGRAPHY

CROSS-REFERENCE TO RELATED APPLICATIONS

The present application is a national stage entry of PCT/US2020/049491 filed on Sep. 4, 2020 and claims priority to U.S. Provisional Application No. 62/896,431, filed Sep. 5, 2019, the teaching of which is incorporated by reference herein in its entirety for all purposes.

BACKGROUND

Field of the Disclosure

The present disclosure relates to image-guided medical procedures, including magnetic resonance image-guided needle-based intervention, and, in particular, arthrography and the evaluation of sports-related injuries.

Description of the Related Art

American children between the ages of 5 and 14 suffer, on average, at least one sports-related injury during their childhood, often involving internal derangements of their shoulders, hips, wrists, and other joints. Magnetic resonance imaging (MRI)-based arthrography is often a gold standard approach for evaluating injuries in these children. Such arthrograms typically consist of a fluoroscopically-guided intra-articular injection of contrast medium immediately followed by an MRI scan of the joint. This procedure, however, can be burdensome, requiring two procedure rooms to (1) provide the fluoroscopically-guided intra-articular contrast injection and to (2) perform the imaging via magnetic resonance. Such a requirement for access to multiple rooms can also result in significant scheduling delays, thus negatively-impacting patient outcomes. Moreover, the use of fluoroscopy for needle guidance exposes patients to ionizing radiation. This exposure is cause for concern in all patients and in pediatric patients, in particular.

An approach has yet to be developed that simplifies the joint evaluation process and reduces radiation exposure.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a system, method, and device for performing arthrography.

According to an embodiment, the present disclosure further relates to a system for performing arthrography, comprising a physical grid positioned on skin of a patient proximate a region of interest of a joint on which the arthrography is to be performed, the physical grid being flexible, non-magnetic and including non-repeating features as features of the physical grid, and processing circuitry configured to receive medical images of the patient, the received medical images being acquired by a same imaging modality and having visible a portion of the physical grid, determine a trajectory between an entry point identified on the physical grid and a target point identified within the region of interest of the joint, the identified entry point and the identified target point being identified within the received medical images of the patient, and generate a target entry angle based on the determined trajectory between the identified entry point and the identified target point, wherein a needle guide device, configured to releasably-hold a needle, is positionable according to the identified entry point and the target entry angle such that the needle is deliverable to the region of interest of the joint along the determined trajectory.

According to an embodiment, the present disclosure further relates to a method for performing arthrography, comprising receiving, by processing circuitry, medical images of a patient, the received medical images being acquired by a same imaging modality and having visible a portion of a physical grid positioned on skin of the patient proximate a region of interest of a joint on which the arthrography is to be performed, the physical grid being flexible, non-magnetic and including non-repeating features as features of the physical grid, determining, by the processing circuitry, a trajectory between an entry point identified on the physical grid and a target point identified within the region of interest of the joint, the identified entry point and the identified target point being identified within the received medical images of the patient, and generating, by the processing circuitry, a target entry angle based on the determined trajectory between the identified entry point and the identified target point, wherein a needle guide device, configured to releasably-hold a needle, is positionable according to the identified entry point and the target entry angle such that the needle is deliverable to the region of interest of the joint along the determined trajectory, and the non-repeating features of the physical grid include combinations of shapes and numbers.

According to an embodiment, the present disclosure further relates to a device for performing arthrography, comprising processing circuitry configured to receive medical images of a patient, the received medical images being acquired by a same imaging modality and having visible a portion of a physical grid positioned on skin of the patient proximate a region of interest of a joint on which the arthrography is to be performed, the physical grid being flexible, non-magnetic, and including non-repeating features as features of the physical grid, determine a trajectory between an entry point identified on the physical grid and a target point identified within the region of interest of the joint, the identified entry point and the identified target point being identified within the received medical images of the patient, and generate a target entry angle based on the determined trajectory between the identified entry point and the identified target point, wherein a needle guide device, configured to releasably-hold a needle, is positionable according to 0000000 the identified entry point and the target entry angle such that the needle is deliverable to the region of interest of the joint along the determined trajectory.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is a flow diagram of a method of performing arthrography, according to an exemplary embodiment of the present disclosure;

DETAILED DESCRIPTION

Figure 1B:
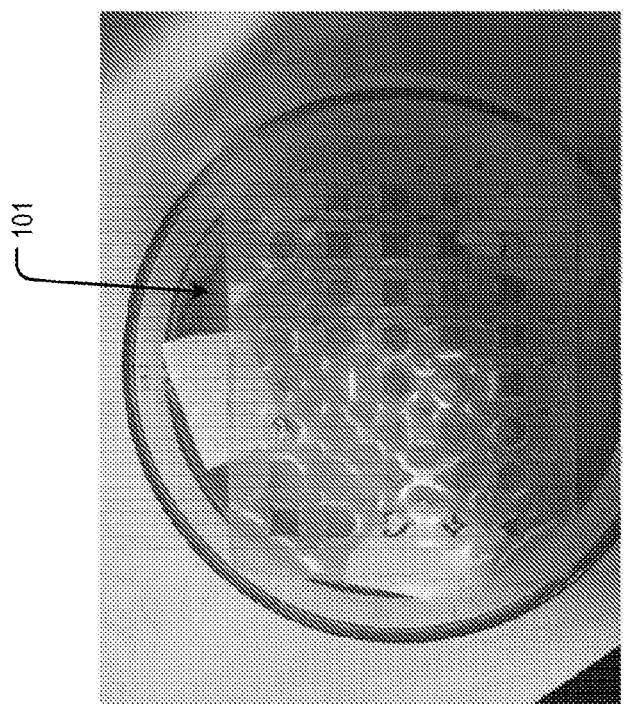
FIG. 1B is an image of a reference grid of an arthrography system, according to an exemplary embodiment of the present disclosure

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Clinical arthrography procedures utilize contrast agents to aid in the visualization of biological tissues of joints of the human body. Current practice includes radiation-based fluoroscopic techniques to deliver the contrast agent to the joint and subsequent imaging in a magnetic resonance imaging (MRI) unit.

As noted above, this approach is cumbersome, requiring multiple rooms and the use of radiation in order to accurately deliver a needle to a joint space. Moreover, while teenagers are not usually sedated for the MRI examination, younger children often are and therefore typically require two separate anesthesia sessions: one for the injection of the contrast agent under fluoroscopy and one for the imaging via the MRI unit. Combining these steps into a single process can further reduce the usage of anesthesia for younger patients.

While different groups have been working to develop MRI-compatible robots for needle-based procedures in the MRI suite, there is a need for a low-cost and non-robotic solution to minimize required setup time and to improve the speed of the procedure, the cost-effectiveness of the procedure, and the availability of the procedure.

These drawbacks can be reduced by, for instance, injecting the contrast agent while the patient is in an MRI suite, thereby eliminating the need for radiation and streamlining the joint evaluation process. Accordingly, the present disclosure describes an MRI-safe needle guidance toolkit that allows for injection of contrast agent and imaging of the joint space within a single MRI session, thereby obviating the needle for radiation.

In an embodiment, the needle guidance toolkit includes a physical grid that may be designed for a given joint of a patient. In an example, the physical grid may be a flexible reference grid designed for a shoulder of the patient and may be shaped so as to conform to the shoulder of the patient. In an embodiment, the physical grid provides an MRI-visible, visual reference for a radiologist in order to determine a needle entry point.

In an embodiment, the needle guidance toolkit includes a handheld device comprising inclinometers and a needle guide that allows a radiologist or other physician to insert a needle at a pre-planned angle through the needle entry point previously identified. The handheld device is designed such that, when an angle of the needle matches the pre-planned angle, the handheld device may be locked in position using an MR-compatible stabilizer arm.

In an embodiment, the handheld device can include two inclinometers to measure two orthogonal angles and a needle guide mechanism to hold, guide, and release the needle once the needle is at the desired position. A latching mechanism may allow for locking and unlocking of the needle from the needle guide mechanism. Angles may be adjusted based on radiological planning of the trajectory of the needle.

In an embodiment, the handheld device can be a mountable device adapted to be held in a fixable position by a mechanical stabilizer arm. The mechanical stabilizer arm may include a locking mechanism to freely move and lock the arm in place.

According to an embodiment, use of the needle guidance toolkit can be incorporated within a clinical workflow. First, a patient can be brought into an MRI suite and positioned on the table of an MRI in a way that facilitates injection of contrast agent into a target joint. If needed, as may be the case for younger patients, the patient can be anesthetized. Next, skin of the patient can be prepared and sterilized. A sterilized, physical grid can then be placed over a region of interest of the target joint of the patient. A high-resolution three-dimensional (3D) MRI dataset can be obtained and sent to a planning workstation. At the planning workstation, which will be described in greater detail with respect to FIG. 5, a radiologist may select a target needle entry point and a target point within the region of interest of the target joint using the 3D MRI dataset. In an embodiment, the needle guidance toolkit includes software configured to simulate a needle trajectory using the 3D MRI dataset and based on the target needle entry point and the target point within the region of interest of the target joint. The radiologist may verify the needle trajectory, corresponding to a skin entry point, pre-planned angle of insertion, and planned path, and adjust, as needed. Following confirmation of the skin entry point, pre-planned angle of insertion, and planned path, the table where the patient resides may be moved out of the MRI scanner so that the radiologist has direct access to the target joint of the patient. Based on the software planning, the radiologist manually inserts the needle through the physical grid until bone in the joint space is felt, indicating that an appropriate needle depth, approximating the target point within the joint, is reached. In order to confirm needle position, the table may then be moved back into the MRI scanner and several image slices around the needle may be acquired. If the needle is not in the joint space, the needle can be placed by trial and error using a standard "advance and check" technique. Once the position of the needle is confirmed, the table may be moved out of the MRI scanner, again, and the radiologist may inject contrast agent into the joint of the patient and then remove the needle. Diagnostic images of the target joint of the patient may be acquired.

According to an embodiment, the present disclosure describes an image processing device configured to assist the radiologist in selecting an entry point on the skin surface of the patient, relative to a target point within a joint space, when only a portion of a physical, reference grid on the skin surface of the patient is visible. Such an instance occurs when the physical grid is not in plane with the MR imaging planes. For example, when the physical grid is parallel with standard sagittal, coronal, or axial planes of an MRI image, the physical grid provides sufficient information for the radiologist to interpret the image and select an entry point thereon. However, when the physical grid is not spatially aligned with one of the standard MRI scanner views, the MR image of the physical grid cannot be intuitively used by radiologist to find the corresponding point on the actual physical grid. In this case, an image processing technique can be used to calculate a coordinate of entry on the actual physical grid given the MR image of the physical and the selected entry point on the image.

According to an embodiment, the present disclosure describes a physical grid that is flexible and designed to conform to a shape of integument surrounding a joint of a patient. In an embodiment, the physical grid includes a series of non-repeating patterns to allow for easy orientation by a radiologist. The physical grid may include features that are spatially-unique and may be fabricated from silicone, in an example. In an embodiment, the physical grid may include, on a skin-contacting surface, an adhesive to prevent unwanted motion of the physical grid relative to the skin surface.

Figure 1A:
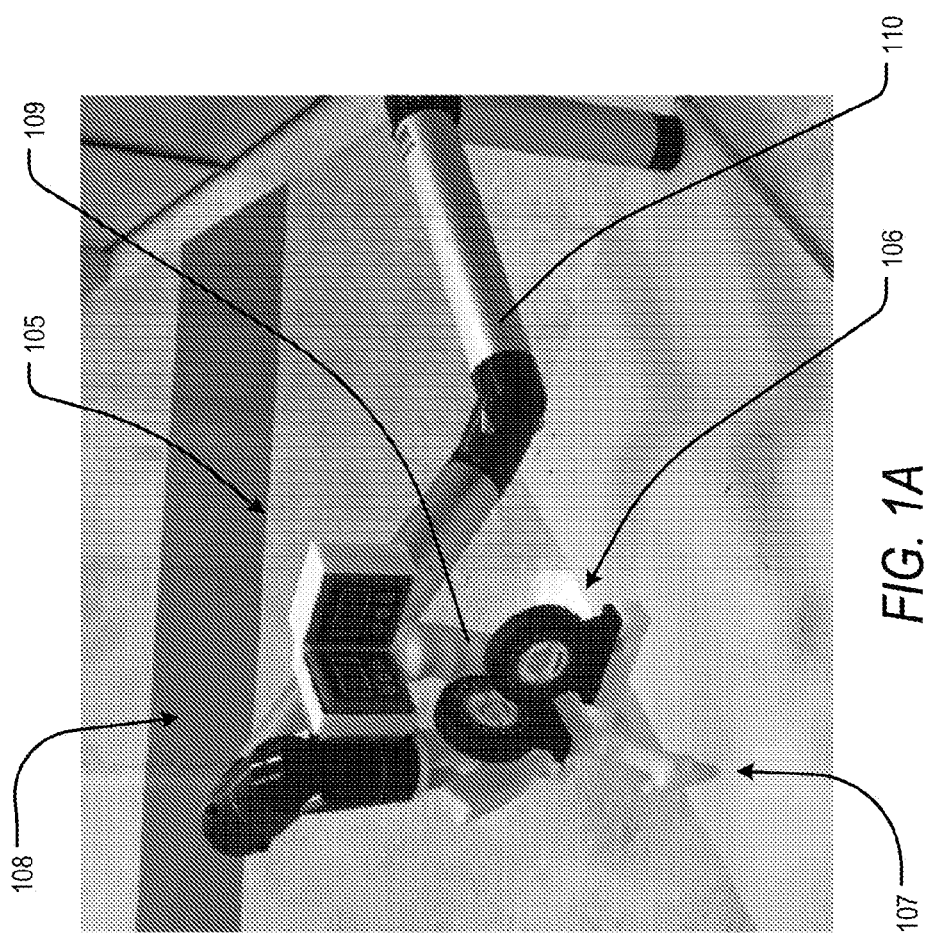
FIG. 1A is an image of a hardware component of an arthrography system, according to an exemplary embodiment of the present disclosure.

Turning now to the Figures, as introduced above, the present disclosure describes a needle guidance toolkit (NGTk) including a hardware component(s) and a software component(s). With reference to FIG. 1A and FIG. 1B, the hardware component(s) of the NGTk may include a physical grid 101, or reference grid, and a needle guidance device 105 comprising inclinometers 106, a needle holder 107, and a stabilizer 108. In an exemplary embodiment, wherein the needle guidance device 105 is a hand-held device, the stabilizer 108 may be a handle 109 of the needle guidance device 105. In other embodiments, the stabilizer may be a fixable mechanical arm mountable to the needle guidance device 105 and configured to rigidly hold the needle guidance device 105 in a prescribed position. In an embodiment, the inclinometers 106 may be two inclinometers providing orthogonal measurements. The reference grid 101, as shown in FIG. 1B, may be flexible, visible by MRI, and may include non-repeating patterns, as will be described below. The software component(s) of the NGTk may include methods for determining a desired position of the reference grid 101 and angles necessary to position the needle guidance device 105 and accurately target the needle into a joint space of a patient. For instance, after acquiring planning MRI images, the software of the NGTk can be used to output an entry point relative to the reference grid 101 and needle angles necessary to accurately target the needle to a target point within the joint space of the patient.

Figure 2:
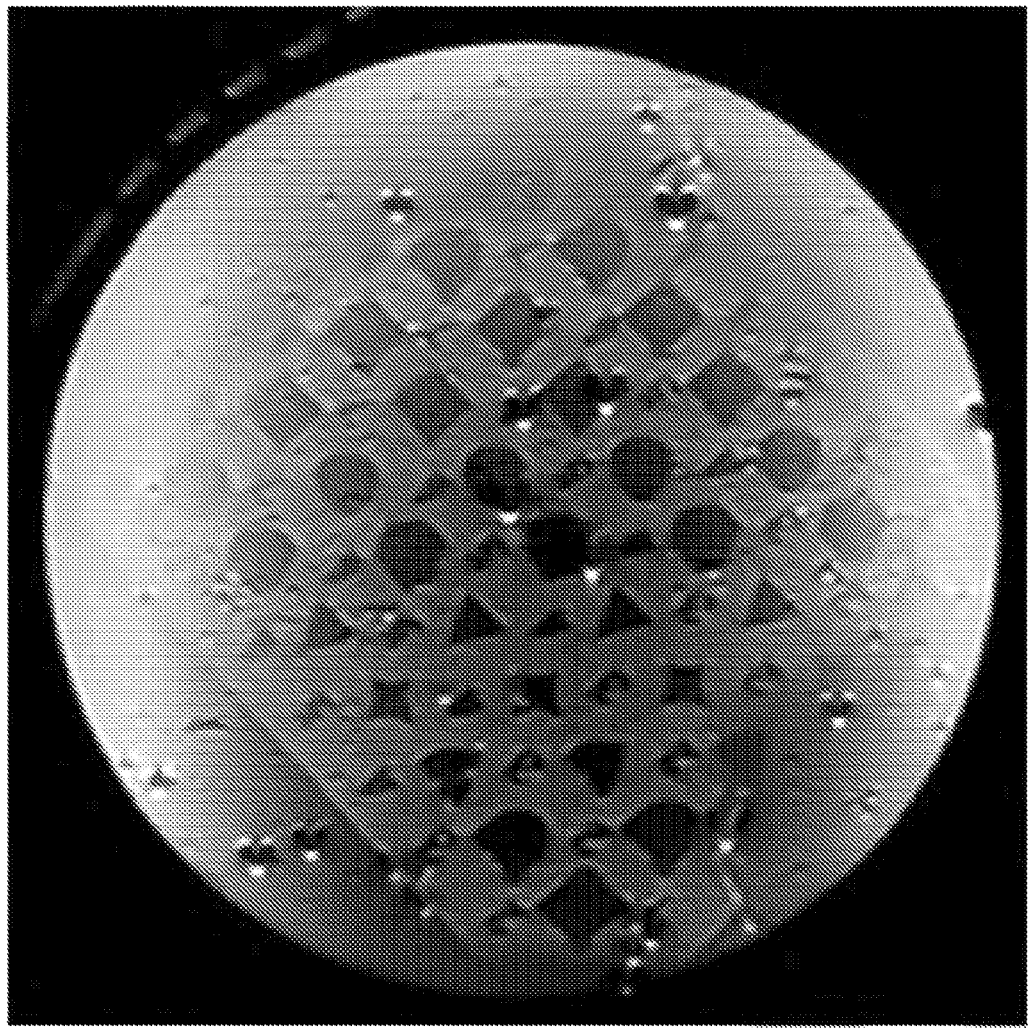
FIG. 2 is an image of a reference grid of an arthrography system under magnetic resonance imaging, according to an exemplary embodiment of the present disclosure.

To this end, the reference grid 101 shown in FIG. 1B may be MR-visible and may be spatially non-repeating with unique features, as shown in FIG. 2. Moreover, the reference grid 101 may be flexible, allowing the reference grid 101 to be positioned over a region of interest of a target joint and conform to the shape of the patient. In this way, the MR-visible spatially non-repeating, unique features of the reference grid 101 can be localized to skin of the patient and to a needle entry point that allows for accurate insertion of the needle into the joint space of the patient under only MR guidance.

In an embodiment, software of the NGTk allows a medical professional to use image guidance to plan needle insertion. The plan may include selection of a target point within the joint space and an entry point on the skin surface of the patient and relative to the reference grid. Based on this plan, the software may generate a set of precise instructions for using the NGTk hardware(s) to position the needle and deliver the needle to the joint space.

Figure 3B:
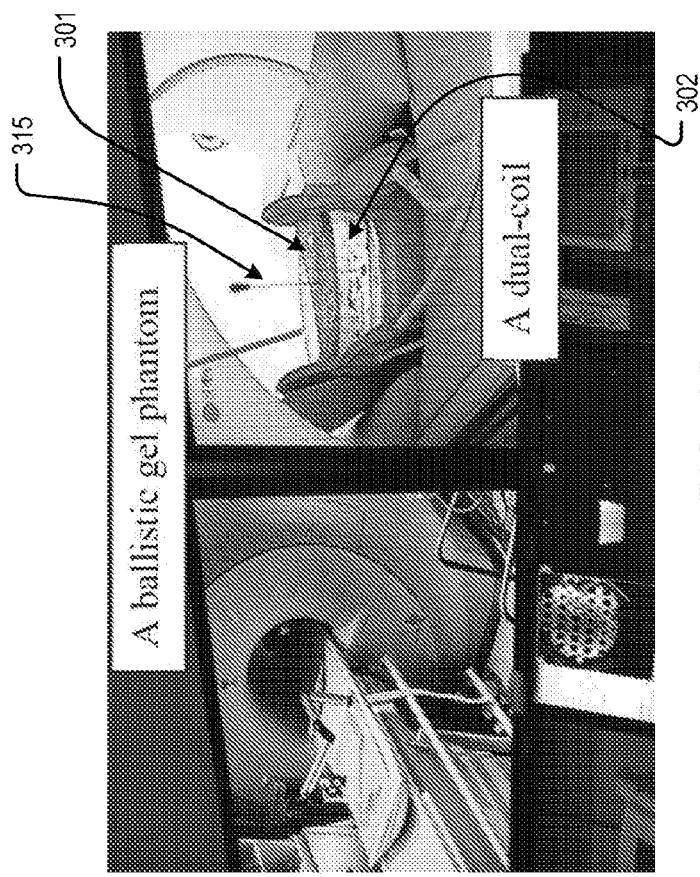
FIG. 3B is an image describing planning of an arthrography procedure using an arthrography system, according to an exemplary embodiment of the present disclosure.
Figure 3A:
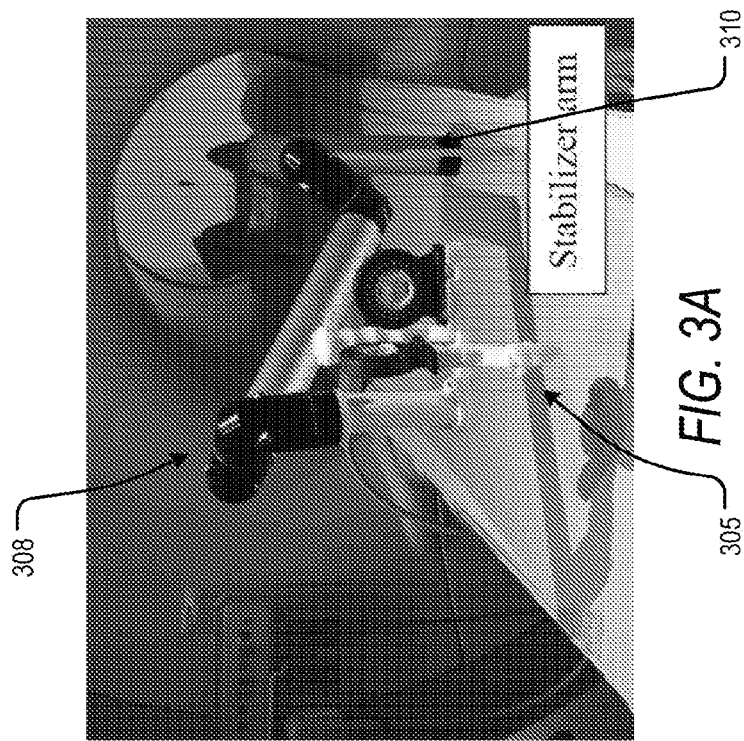
FIG. 3A is an image of a hardware component of an arthrography system interacting with a magnetic resonance imaging unit, according to an exemplary embodiment of the present disclosure.

According to an embodiment, the NGTk of the present disclosure was initially evaluated in a phantom 302, as shown in FIG. 3A through FIG. 3D. FIG. 3A demonstrates a needle guidance device 305 in an exemplary set up within an MRI suite. Though it can be appreciated the needle guidance device may be hand-held (as a stabilizer), in an embodiment, the needle guidance device 305 of FIG. 3A includes a stabilizer arm 310 as a stabilizer 308. FIG. 3B demonstrates a needle being guided to a target point by the NGTk during implementation within the phantoms.

During the initial evaluation, a reference grid 301 was placed on top of a ballistic gel phantom 302. The ballistic gel phantom 302 included three layers of plastic targets of different size (3.175 mm, 4 mm, 4.75 mm, and 6.35 mm). A Philips SENSE FLEX-M imaging coil was used and was placed on opposing sides of the ballistic gel phantom 301 to provide enough coverage and sensitivity to localize structures of interest. The evaluation was conducted in a 1.5 T Philips Achieva MRI system with a 20G MRI-compatible needle (T1w; 3D Spin echo; Flip angle 10 degrees; TR=5.3; TE=1.96; number of slices=120; slice thickness=0.8 mm).

Figure 3D:
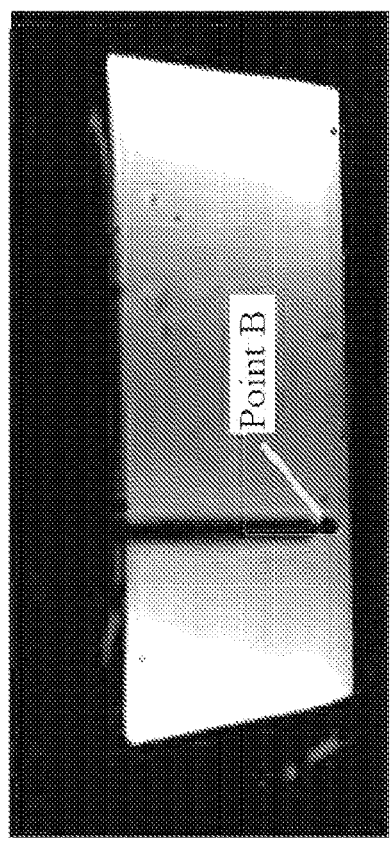
FIG. 3D is a magnetic resonance image of a needle positioned within a phantom, according to an exemplary embodiment of the present disclosure.
Figure 3C:
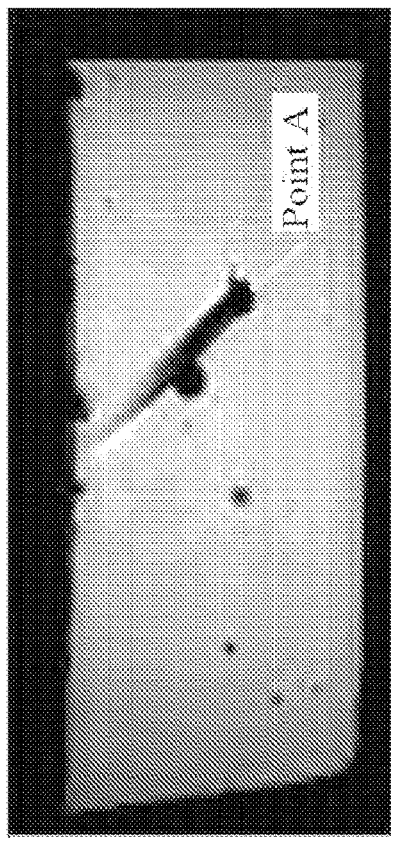
FIG. 3C is a magnetic resonance image of a needle positioned within a phantom, according to an exemplary embodiment of the present disclosure.

After acquiring a series of MR images, different ones of the plastic targets were randomly selected and a trajectory thereto was planned. The trajectory to the randomly selected target point was based on an entry point on a surface of the ballistic gel phantom 302 selected with reference to the reference grid 301. Using the needle guidance device 305, the needle was positioned relative to the selected entry point and the determined trajectory and inserted into the ballistic gel phantom 302 toward the target. To avoid needle deformation the needle was periodically rotated while it was pushed through the ballistic gel phantom 302 and to the target. FIG. 3C and FIG. 3D illustrate MR images acquired after targeting two different points, Point A and Point B. As shown in Table 1, the targeting study, writ large, was repeated for 10 points and accuracy results were reported. Results of attempts at Point A and Point B correspond to Target T1 and Target T4, respectively, of Table 1. During the evaluation, the needle was left in place after each targeting and confirmation images were acquired. Using these confirmation images the error, as shown in Table 1, was measured. The measurement included selecting multiple points along the needle, fitting a straight line to the points, and calculating, by image processing, a shortest Euclidean distance between the line and the target point. Results demonstrated an error of less than 5 mm with attendant precision and procedure duration of less than 15 minutes. As shown in Table 1, the 'Error' reflects the 'Entry Point', or the actualized needle position, in view of the intended needle position, or 'Target Point'.

TABLE 1

| Target | Error (mm) | Entry Point | Target Point |
|---|---|---|---|
| T1 | 2.51 | (−14.62, −8.66, −9.22) | (−16.82, −43.50, 23.88) |
| T2 | 2.35 | (−16.73, −9.51, 24.40) | (−16.82, −43.50, 23.88) |
| T3 | 2.15 | (−5.04, −29.66, −19.60) | (−5.45, −79.22, −21.23) |
| T4 | 2.40 | (−77.81, 19.35, 42.56) | (5.13, −80.68, 41.62) |
| T5 | 3.14 | (−49.47, −28.20, −1.86) | (−48.75, −63.75, 0.06) |
| T6 | 2.67 | (−59.05, −80.19, 30.03) | (−57.83, −31.11, 30.38) |
| T7 | 2.03 | (−23.76, −32.57, 31.34) | (−25.51, −65.13, −31.78) |
| T8 | 0.54 | (−12.27, −10.42, 24.07) | (−13.41, −32.97, 2.01) |
| T9 | 2.49 | (10.24, −8.91, 10.83) | (9.24, −32.97, −16.42) |
| T10 | 1.76 | (10.86, −28.62, 46.51) | (11.77, −79.82, 48.83) |
| Average | | | 2.20 mm |
| Standard Deviation | | | 0.69 mm |

In view of the above, FIG. 4A provides a flow diagram of a procedure for performing arthrography. The arthrography may be performed on a joint of a patient and may be performed to evaluate function and diagnose any pathologies that may require treatment.

According to an embodiment, method 400 of FIG. 4A may include preparation, planning, and injection of contrast agent that is visible by MR for evaluation of the joint space.

To this end, at step 420 of method 400, a patient may be positioned on a table of an MRI unit within an MRI suite. The patient may be seated in a position appropriate for contrast injection into a joint of interest. If needed, as may be the case for certain younger patients, aesthesia may be administered. Following positioning and sedation, if required, skin of the patient around the region of interest of the joint can be prepared and sterilized. A reference grid can then be applied to the prepared skin. In an example, the joint can be a shoulder and the reference grid, which is fabricated from a flexible material such as a silicone, can be placed over the shoulder, following the curvature thereof.

At sub process 425 of method 400, an initial MR image dataset can be acquired of the joint, with the reference grid affixed thereto, and the procedure by which the needle can be introduced to the joint space of the joint is planned. Though described in greater detail with reference to FIG. 4B, outputs of sub process 425 include a target entry point, or target needle entry point and a target entry angle. The target entry point may be determined in view of positions on at least a portion of the reference grid that is visible within the MR image dataset and based on a target point within the joint space of the patient, or target intraarticular point, and a trajectory generated therebetween. The entry point, the target point within the joint space, and the trajectory, which may be generated by a computer processor, can be iteratively calculated until a radiologist or other medical professional determine the path is acceptable.

At step 430 of method 400, a needle may be initially placed with the aid of a needle guidance device and based on the planned entry point and entry angle. The needle guidance device, which may be handheld or may be stabilized by a mechanical arm, can be positioned relative to the reference grid on the shoulder of the patient such that the needle holder of the needle guidance device, and thus the needle, are arranged in a precise location and at a precise angle relative to the reference grid and the joint space of the shoulder. After positioning the needle guidance device, the needle can be inserted into the patient to a certain depth marked on the needle. In an embodiment, the needle may be inserted along the determined trajectory until a bony surface of the joint space is contacted.

Before administering contrast agent, a series of MR images of the joint can be acquired so that correct positioning of the needle within the joint space can be confirmed. If it is determined that the needle is not correctly positioned, the radiologist or other medical professional may reposition the needle by standard 'advance and check' in order to correctly position the needle in the joint space. Iterative images may be acquired until confirmation of the needle within the joint space is attained.

Having confirmed the position of the needle at step 430 of method 400, the patient may be removed from the MRI unit and the resident needle may be used to deliver contrast agent to the joint space of the patient at step 435 of method 400. Subsequently, the needle may be removed from the patient and the shoulder joint, in this example, may be imaged diagnostically.

Figure 4B:
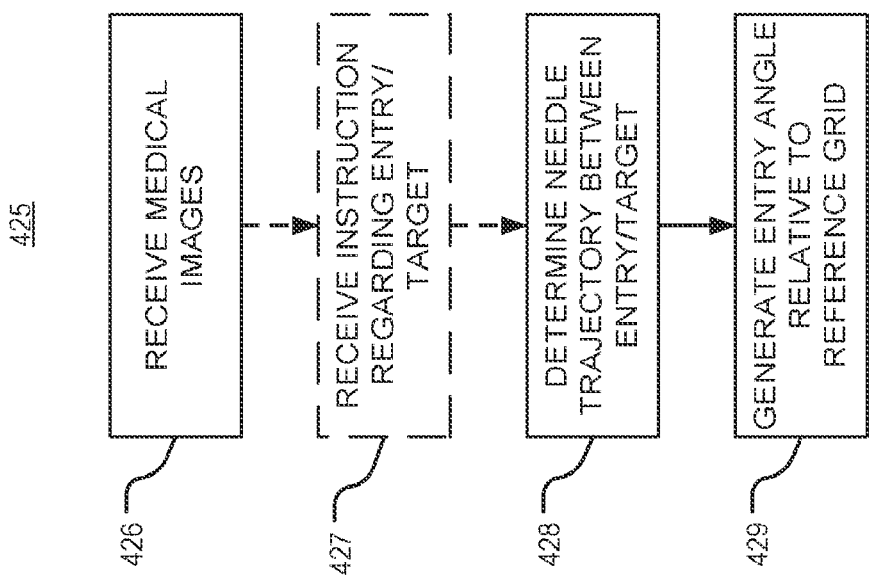
FIG. 4B is a flow diagram of a sub process of a method of performing arthrography, according to an exemplary embodiment of the present disclosure.

FIG. 4B provides further description of sub process 425 of method 400. At least a portion of the sub process of FIG. 4B can be performed by processing circuitry of a computer, as will be described below.

Following preparation of the skin surface of the patient, placement of the reference grid, and positioning of the patient within the MRI unit, medical images may be acquired and may be received by processing circuitry at step 426 of sub process 425. The received medical images may constitute a 3D volume of a joint of interest and may capture each of at least a portion of the reference grid and a joint space of the joint of interest.

In the event that a radiologist defines relevant landmarks and features of a needle path to the joint space, step 427 of sub process 425 allows for receiving, by the processing circuitry, instruction from the radiologist related to the defined landmarks and needle path. For instance, the radiologist may define, on the skin surface of the patient and relative to the reference grid, an entry point. The radiologist may further define a target point within the joint space, or an intraarticular point, that establishes an end point of a needle path. Accordingly, at step 428 of sub process 425, the processing circuitry may determine a trajectory between the identified entry point and the identified target point.

However, in the event a radiologist does not define relevant landmarks and features of a needle path to the joint space, the processing circuitry can be configured to identify an entry point, a target point, and a trajectory therebetween at step 428 of sub process 425, bypassing step 427. For instance, given that a 3D MRI dataset of the joint includes at least a portion of the reference grid and the joint space, the processing circuitry can be configured to perform segmentation on the 3D MRI dataset to localize the portion of the reference grid and the joint space. Subsequently, the segmented reference grid and the segmented joint space can be spatially evaluated to identify a line between the two segmented areas of the image to identify a best approach or trajectory of the needle path. In an example, the line between the two segmented areas of the image can be a shortest distance therebetween. In another example, the line between the two segmented areas of the image can be a shortest distance therebetween that is cognizant of hard tissues and other sensitive structures. For instance, the line may be one that does not pass through pixels having densities that exceed a threshold. The spatial evaluation may be a 3D pixel-based approach to determine a shortest approach to the joint space of the patient. Having determined a shortest approach to the joint space of the patient from the reference grid, a depth-wise offset may be implemented on the joint space side to ensure access to the joint space by the needle. Then, a trajectory may be determined between the entry point and the target point of the joint space.

If performed according to either approach described above, sub process 425 continues to step 429 wherein the entry point and the determined trajectory of the needle path are used to generate an entry angle of the needle during insertion. In an example, the entry angle may be based on a curvature of the skin over the region of interest of the joint and may be represented by a curved surface of the reference grid adhered thereto.

Having identified an entry point and a target point within the joint space, determined a trajectory of a needle moving therebetween, and generated an entry angle of a needle, sub process 425 of process 400 may pass this information along to step 430 of method 400 and the arthrography procedure may proceed.

Figure 5:
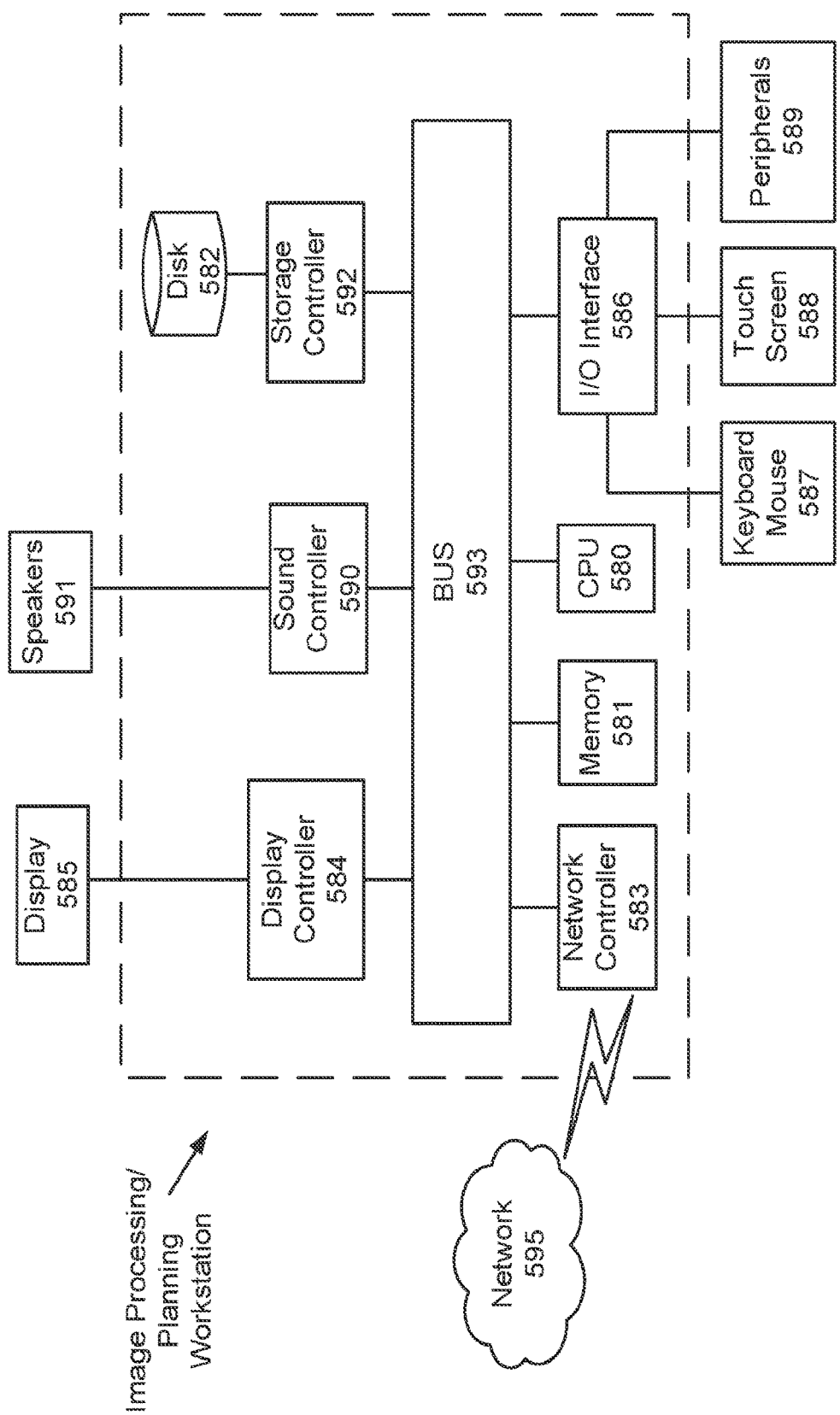
FIG. 5 is an illustration of a hardware component of an arthrography system, according to an exemplary embodiment of the present disclosure.

Next, a hardware description of an imaging processing device/planning workstation according to exemplary embodiments is described with reference to FIG. 5. In an embodiment, the image processing device can be used to determine a trajectory between a target entry point and a target within the joint space, or intraarticular target point, in order to deliver the needle to the joint space. In an embodiment, the target entry points may be developed interactively with a treating medical professional. In FIG. 5, the image processing device includes a CPU 580 which performs the processes described above/below. The process data and instructions may be stored in memory 581. These processes and instructions may also be stored on a storage medium disk 582 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the image processing device communicates, such as a server or computer.

Further, the claimed advancements may be provided as a utility application, background daemon, or component of an operating system, or combination thereof, executing in conjunction with CPU 580 and an operating system such as Microsoft Windows 7, UNIX, Solaris, LINUX, Apple MAC-OS and other systems known to those skilled in the art.

The hardware elements in order to achieve the image processing device/planning workstation may be realized by various circuitry elements, known to those skilled in the art. For example, CPU 580 may be a Xenon or Core processor from Intel of America or an Opteron processor from AMD of America, or may be other processor types that would be recognized by one of ordinary skill in the art. Alternatively, the CPU 580 may be implemented on an FPGA, ASIC, PLD or using discrete logic circuits, as one of ordinary skill in the art would recognize. Further, CPU 580 may be implemented as multiple processors cooperatively working in parallel to perform the instructions of the inventive processes described above.

The image processing device/planning workstation in FIG. 5 also includes a network controller 583, such as an Intel Ethernet PRO network interface card from Intel Corporation of America, for interfacing with network 595. As can be appreciated, the network 595 can be a public network, such as the Internet, or a private network such as an LAN or WAN network, or any combination thereof and can also include PSTN or ISDN sub-networks. The network 595 can also be wired, such as an Ethernet network, or can be wireless such as a cellular network including EDGE, 3G and 4G wireless cellular systems. The wireless network can also be WiFi, Bluetooth, or any other wireless form of communication that is known.

The image processing device/planning workstation further includes a display controller 584, such as a NVIDIA GeForce GTX or Quadro graphics adaptor from NVIDIA Corporation of America for interfacing with display 585, such as a Hewlett Packard HPL2445w LCD monitor. A general purpose I/O interface 586 interfaces with a keyboard and/or mouse 587 as well as a touch screen panel 588 on or separate from display 585. General purpose I/O interface 586 also connects to a variety of peripherals 589 including printers and scanners, such as an OfficeJet or DeskJet from Hewlett Packard.

A sound controller 590 is also provided in the image processing device/planning workstation, such as Sound Blaster X-Fi Titanium from Creative, to interface with speakers/microphone 591 thereby providing sounds and/or music.

The general purpose storage controller 592 connects the storage medium disk 582 with communication bus 593, which may be an ISA, EISA, VESA, PCI, or similar, for interconnecting all of the components of the image processing device. A description of the general features and functionality of the display 585, keyboard and/or mouse 587, as well as the display controller 584, storage controller 592, network controller 583, sound controller 590, and general purpose I/O interface 586 is omitted herein for brevity as these features are known.

The NGTk allows for streamlined arthrography procedures under MRI so they can be done entirely in one room. Currently, such procedures require two rooms and two imaging modalities: (1) fluoroscopically-guided needle insertion in a fluoroscopy suite followed by (2) diagnostic MRI in a separate MRI suite. The use of fluoroscopy for needle placement exposes patients to ionizing radiation, which is an important concern, especially in pediatrics. The need for two different rooms complicates hospital resource scheduling, and added delays could expose younger children to additional risks associated with the use of general anesthesia. The NGTk consists of a 3D slicer-based user interface, a spatially unique silicon reference grid, and a hand-held needle-guidance device intended to simplify and shorten the procedure while maintaining accuracy and precision comparable to the current gold standard procedure.

The NGTk includes a spatial reference template, or reference grid, and a needle guidance device that, in combination, enable MRI-guided pediatric arthrography. The MR-visible reference grid can be attached to the patient in the MRI scanner and the hand-held needle guidance device will be utilized to precisely orient a needle, based on the MR images, for contrast agent injection into the joint space. To this end, a physician can place a needle through the needle guide, and the intraarticular needle tip position can be verified via MR. The physician can then inject MR contrast agent into the joint space and withdraw the needle. A diagnostic MRI can then be obtained to observe the spread of the contrast and evaluate joint pathology.

As part of the present disclosure, a non-limiting example is included below. The example is for illustrative purposes only and is not intended to limit the invention. In fact, that which is described below may not be exemplary embodiments of the present disclosure but instead examples intended to provide contrast between non-limiting examples of the present disclosure and other practices in the field. Those of ordinary skill in the art will readily recognize parameters that can be changed or modified to yield essentially the same results.

Non-Limiting Experimental Results

A cadaver study was completed to evaluate the accuracy of the NGTk for MRI arthrography procedures. To this end, a targeting study of MRI-guided needle insertion into the shoulder joint space was performed on an 83-year-old female cadaver.

The NGTk included a spatially unique reference grid, a hand-held needle guidance device, and a 3D slicer-based computer processing user interface for guidance of needle insertion. For manual path planning in needle-based procedures, a radiologist selects two points, for example, an entry point, in the context of skin of the patient and the reference grid applied thereto, and a target point within joint space of the joint, that ensure a clear path from skin to the joint space while avoiding bony structures and/or critical anatomy such as nerves and large blood vessels. The reference grid is MRI-visible and flexible so that it conforms to skin contours of the patient and provides an MRI visible reference for each point on the skin. The MRI visible reference grid provides guidance for planning the desired path and locating the needle tip on the skin entry point as selected by the radiologist on the MR images. The reference grid allows easy cross-identification of points in MR images and visible reference grid/skin locations.

Figure 6B:
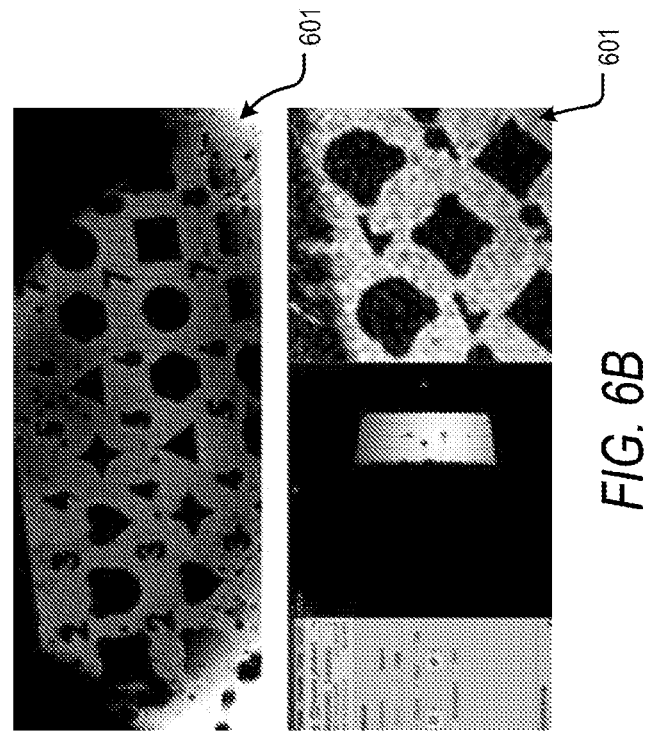
FIG. 6B is an image describing viewing a reference grid under magnetic resonance imaging and identifying features of the reference grid, according to an exemplary embodiment of the present disclosure.
Figure 6A:
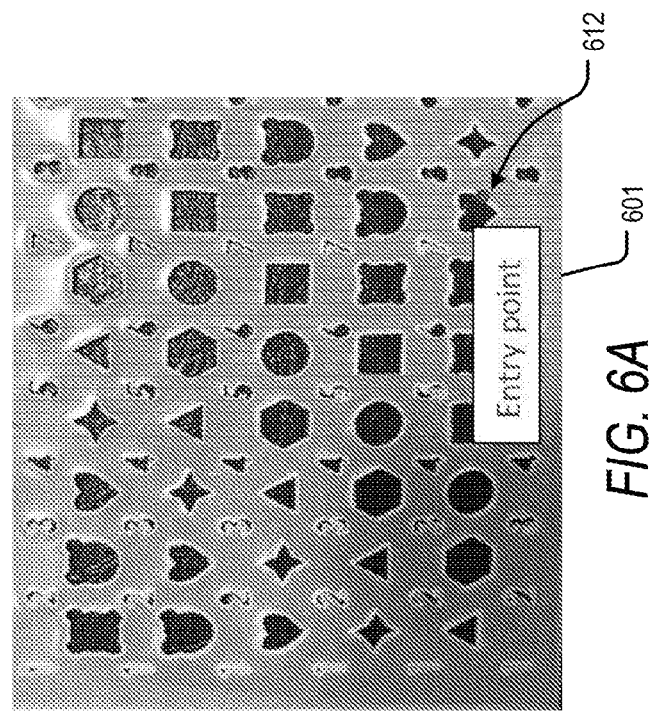
FIG. 6A is an image of a reference grid of an arthrography system and hypothetical entry point identified based on the planned entry point using the reference grid MRI, according to an exemplary embodiment of the present disclosure.

The reference grid of the NGTk is a flexible reference grid 601, as seen in FIG. 6A. The flexible reference grid 601 achieves its flexibility by being fabricated from silicone (ReoFlex 40 DRY, Smooth-on Inc., PA, USA), a flexible, sterilizable material. Silicone, moreover, is MRI safe and is routinely imaged via MRI to ensure safety of certain implants post-implantation. As shown in FIG. 6A, the flexible reference grid 601 includes spatially-unique features. The spatially-unique features may include shapes and numbers arranged in a manner that allows them to be spatially-identified within an MR image, even when only a portion of the flexible reference grid 601 is visible. The flexible reference grid 601 is fabricated by silicone molding, including the use of a mold, featuring the spatially-unique features, fabricated via three-dimensional printing.

Figure 6D:
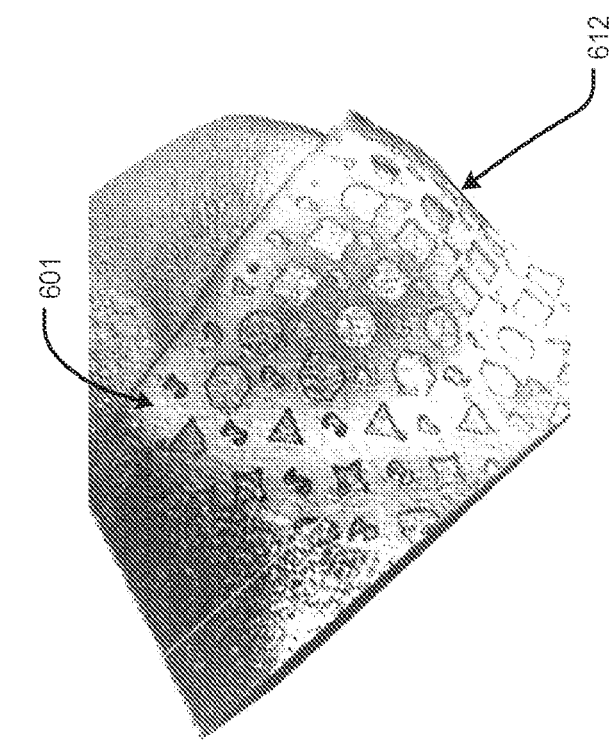
FIG. 6D is an image of a 3-dimensional reconstruction of a reference grid under magnetic resonance imaging, according to an exemplary embodiment of the present disclosure.
Figure 6C:
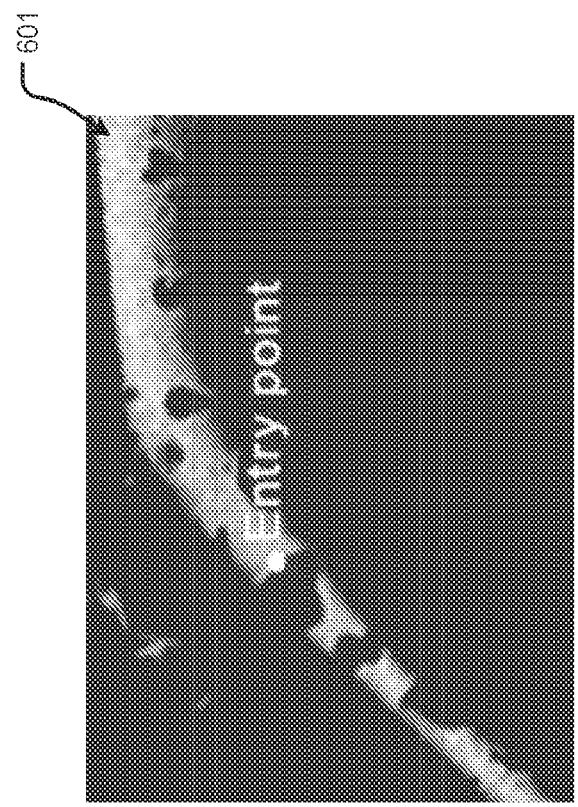
FIG. 6C is an image of a portion of a reference grid under magnetic resonance imaging with hypothetical planned entry point by a physician, according to an exemplary embodiment of the present disclosure.
Figure 7B:
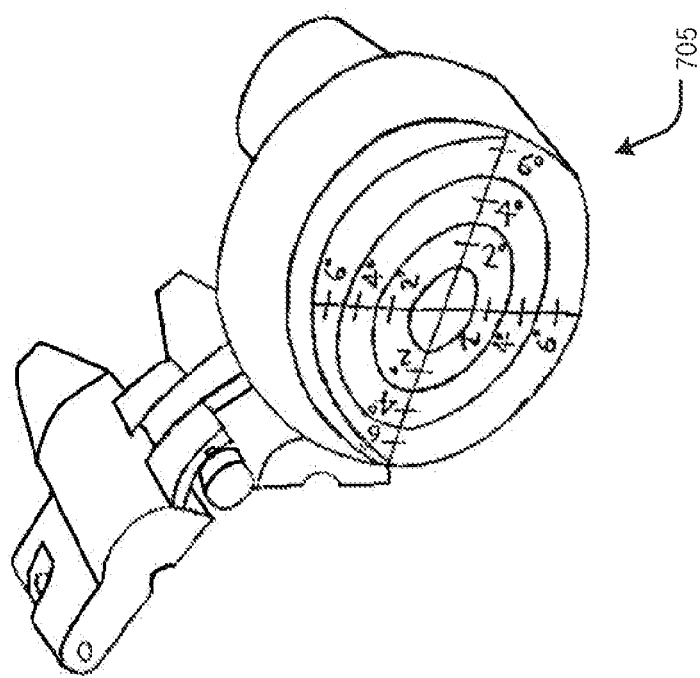
FIG. 7B is an image of a hardware component of an arthrography system, according to an exemplary embodiment of the present disclosure.
Figure 7A:
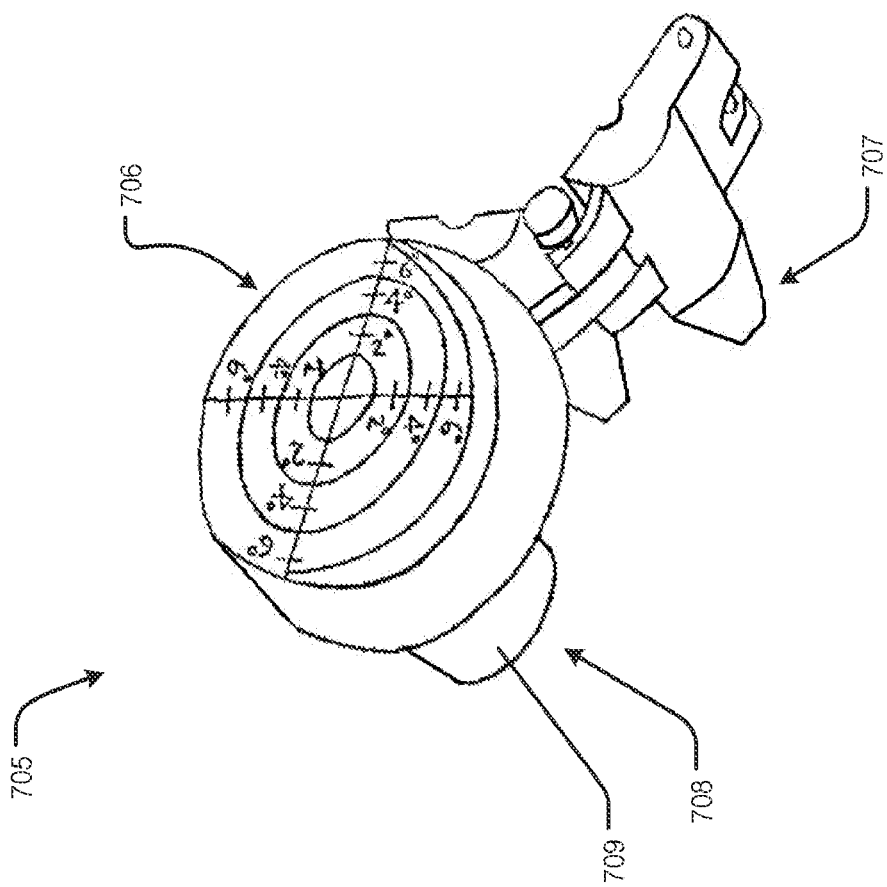
FIG. 7A is an image of a hardware component of an arthrography system, according to an exemplary embodiment of the present disclosure.
Figure 7D:
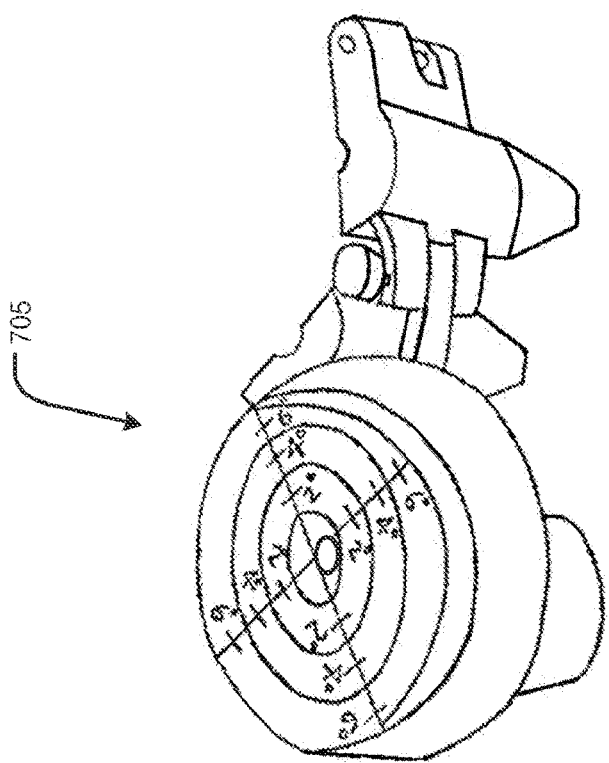
FIG. 7D is an image of a hardware component of an arthrography system, according to an exemplary embodiment of the present disclosure.
Figure 7C:
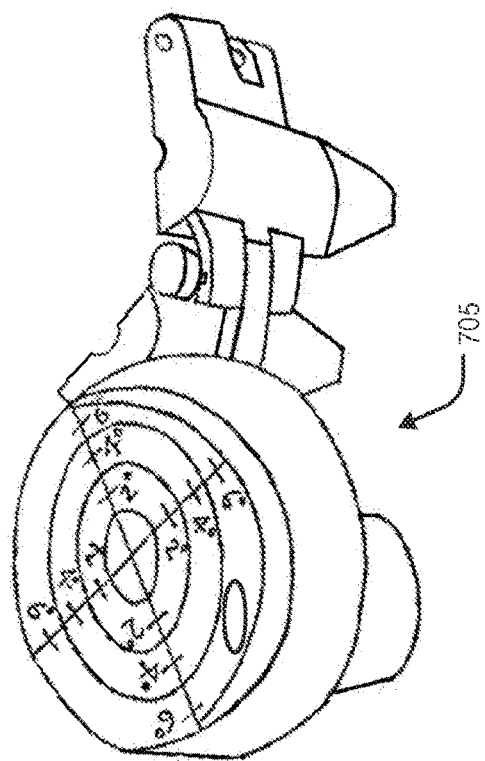
FIG. 7C is an image of a hardware component of an arthrography system, according to an exemplary embodiment of the present disclosure.

The flexible reference grid 601 was tested for MRI visibility in a 1.5 T Philips Achieva MRI system. The flexible reference grid 601, as shown in FIG. 6B, provided adequate signal intensity so that its spatially variant features could be used to identify an entry point relative to a specific region of skin surface. FIG. 6B provides conventional T1-weighted MR images of the flexible reference grid 601 and provides a magnified inset that indicates the spatial variance in the flexible reference grid 601. FIG. 6C provides an illustration of the flexible reference grid 601 when not in-plane with a plane of the acquired MR image. In such an instance, the portion of the flexible reference grid 601 visible in FIG. 6C, which includes the 'Entry point', can be used, in an embodiment, to extrapolate and to render a 3D image of the entire flexible reference grid 601, as shown in FIG. 6D. The 3D rendered image of FIG. 6D can be generated using a rendering module and can be used to locate the 'Entry point' 612 on the surface of the grid such that a needle tip may be located relative thereto.

The hand-held needle guide device 705 of the NGTk is illustrated in FIG. 7A through FIG. 7D. The needle guide device 705 includes a needle guide 707, bubble level 706, and a stabilizer 708. As in FIG. 7A, the stabilizer 708 can include a handle 709 and/or a stabilizer arm. For repeatability, the stabilizer arm can be used as the stabilizer 708 for the evaluations performed herein. The needle guide device 705 was fabricated by three-dimensional printing using VeroWhite plastic in a rapid prototyping machine (Objet 500, Stratasys, Rehovot, Israel). The needle guide device 705 includes at least one spherical bubble level 706 that can measure the pitch and yaw angles (e.g., range −6 to 6 degrees in each direction). The needle guide device 705 is designed so that, after needle placement, the needle guide device 705 can be separated from the needle while the needle remains positioned in the joint.

The flexible reference grid and needle guidance device, in combination, allow a radiologist to position and angulate the needle properly to insert the needle and to reach the target.

Figure 8:
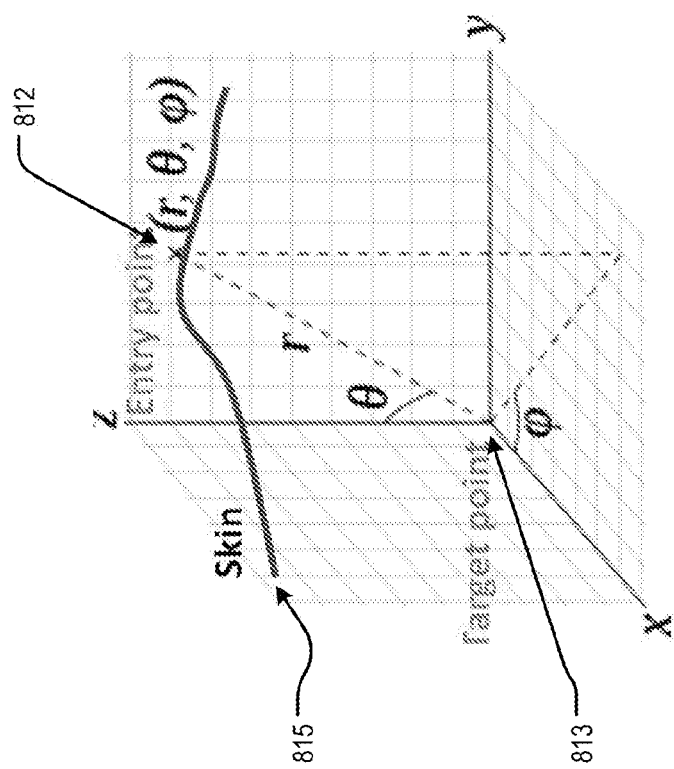
FIG. 8 is an illustration of a planning tool for determining a trajectory of an arthrography system, according to an exemplary embodiment of the present disclosure.

Path planning is conducted manually by a radiologist through selection of an entry point on the flexible reference grid conformed to the skin and a target point within the joint space using acquired MRI images including the joint and the flexible reference grid. Having selected the entry point and the target point within the joint space, needle angulations are calculated using spherical coordinate system. To this end, FIG. 8 illustrates a spherical coordinate system with an entry point 812 and a target point 813 labeled thereon. Needle angulation, i.e. θ and φ, can be seen as two of the three Euler angles. As shown in FIG. 8, the origin of the spherical coordinate frame is assumed to be the target point 813. The entry point 812 is located in (r, θ, φ) with respect to spherical coordinate frame and on a skin surface 815. The needle is assumed to be initially aligned along the z-axis so that $\vec{r}_0 = [0,0,r]$ represents the direction of the needle in the home position. By rotating this vector about the y-axis by θ, and then along the z-axis by φ, $\vec{r}$ will be aligned with the desired trajectory and could be represented as follows:

$$\vec{r} = R_z(\theta) R_y(\theta) \begin{pmatrix} 0 \\ 0 \\ r \end{pmatrix} \quad (1)$$

where $R_z(\varphi)$ and $R_y(\theta)$ are respective rotation matrices about the z-axis and y-axis. These rotation matrices can be further defined by:

$$R_z(\theta) = \begin{pmatrix} \cos\varphi & -\sin\varphi & 0 \\ \sin\varphi & \cos\varphi & 0 \\ 0 & 0 & 1 \end{pmatrix}, \text{ and} \quad (2)$$

$$R_y(\theta) = \begin{pmatrix} \cos\theta & 0 & \sin\theta \\ 0 & 1 & 0 \\ -\sin\theta & 0 & \cos\theta \end{pmatrix}$$

In view of the above, it can be said that $\vec{r}_x = r \cos\varphi \sin\theta$, $\vec{r}_y = r \sin\varphi \sin\theta$, and $\vec{r}_x = r \cos\theta$ \quad (3)

Since $\vec{r}$ is known, θ and φ can be simply calculated using the equations of (3).

The presently-described cadaver study investigated the targeting accuracy of NGTk in a realistic setting. One female cadaver was utilized for the study. T1-weighted MR imaging was used for path planning, exploiting the MR visibility of the flexible reference grid described above. For path planning, Spin Echo imaging was utilized as it offers improved anatomical imaging quality for visualization of the joint space.

An interventional radiologist performed needle placement in this cadaveric study. To this end, the interventional radiologist adhered to the following workflow. First, the patient is prepared for imaging, including positioning the patient on the table of the MRI scanner, preparing and sanitizing the skin of the region of interest, and placing the flexible reference grid on the sanitized skin surface. Next, initial imaging and planning is performed, including imaging the region of interest and planning the needle trajectory by selecting the entry point, selecting the target point, and calculating angles therebetween using the above-described equations. In other words, this includes planning the desired trajectory to reach the joint space, which includes finding the entry point on the surface of the flexible reference grid and calculating the needle angulation to achieve the trajectory. Next, the needle is inserted within the joint space according to the planned trajectory. This is accomplished by performing the needle insertion according to the planned path and includes moving the table and using the needle guidance device to orient the needle and deliver the needle to the joint space at an appropriate location and angle. The needle is advanced into the joint space until a hard tissue, such as a bone, is reached. After insertion, the table may be moved into an imaging position and the position of the needle relative to the intended target point can be evaluated. Following confirmation of the position of the tip of the needle within the joint space, the needle guidance device can be separated from the needle and the table can be moved such that the interventional radiologist can access the needle in order to inject a contrast agent into the joint space of the patient. Once injected, the needle can be removed from the patient and diagnostic images of the joint of the patient can be acquired.

Figure 9B:
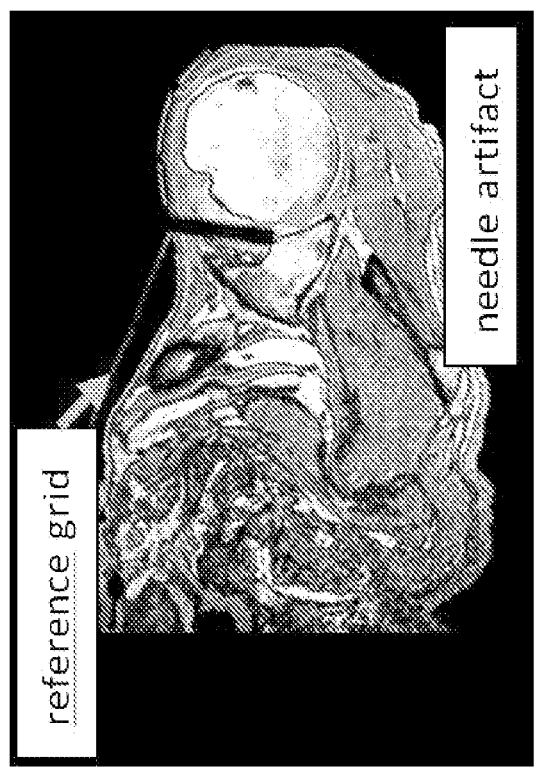
FIG. 9B is an image of a joint of a patient during performance of an arthrography procedure, according to an exemplary embodiment of the present disclosure.
Figure 9A:
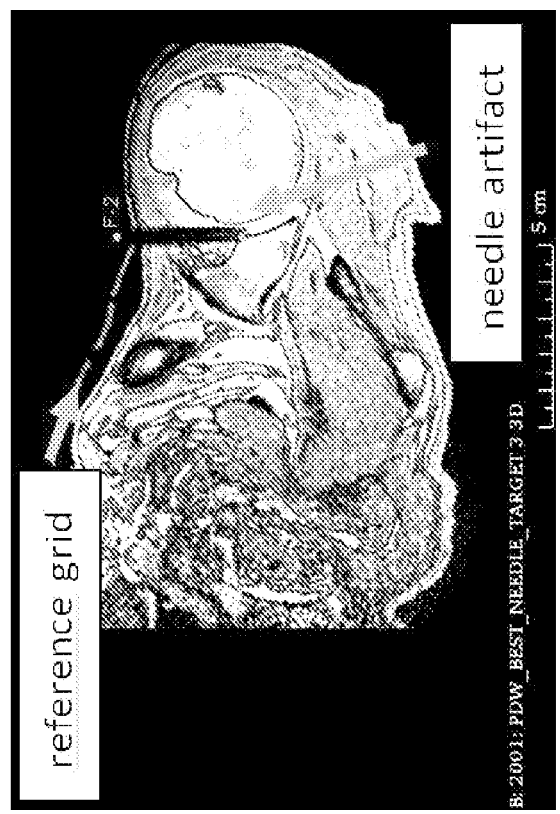
FIG. 9A is an image of a joint of a patient during performance of an arthrography procedure, according to an exemplary embodiment of the present disclosure.

FIG. 9A and FIG. 9B shows the cadaver study setup. The targeting study was conducted on the left shoulder of the cadaver by selecting five different entry points and five different, corresponding target points. After each planning and needle insertion, confirmation images were acquired via MRI to confirm the accuracy of the targeting. Exemplary confirmation images are shown in FIG. 9A and FIG. 9B. To calculate the accuracy of the targeting, the normal distance between the needle and the target point was calculated as the targeting error. For this, 10 to 20 points were manually selected along the center of image artifact of the needle and a straight line was fitted to these points using Singular Value Decomposition function from MATLAB. The Euclidean distance between this line, approximating the needle, and the target point selected by the radiologist, was calculated for

TABLE 2

| Targets | Desired entry point | Desired Target point | Normal distance error |
|---|---|---|---|
| T1 | (−73.27, −9.66, 38.39) | (−75.82, −46.77, 38.09) | 4.8 mm |
| T2 | (−76.34, −9.19, 34.79) | (−76.34, −47.01, 34.79) | 2.44 mm |
| T3 | (−74.48, −9.45, 18.59) | (−77.39, −45.62, 18.59) | 3.70 mm |
| T4 | (−68.57, −8.20, 34.73) | (−76.56, −45.20, 34.79) | 2.67 mm |
| T5 | (−79.76, −8.86, 32.09) | (−76.98, −48.53, 32.09) | 2.50 mm |
| | Average and standard deviation | | 3.22 ± 1.01 mm | each targeting attempt. Table 2 shows the targeting accuracy for each attempt. As shown in Table 2 the average targeting accuracy of this study was 3.22±1.01 mm.

As shown in Table 2, the targeting error was significantly reduced after Target T1 to below 5 mm, which is established as the clinically-required accuracy.

Figure 10C:
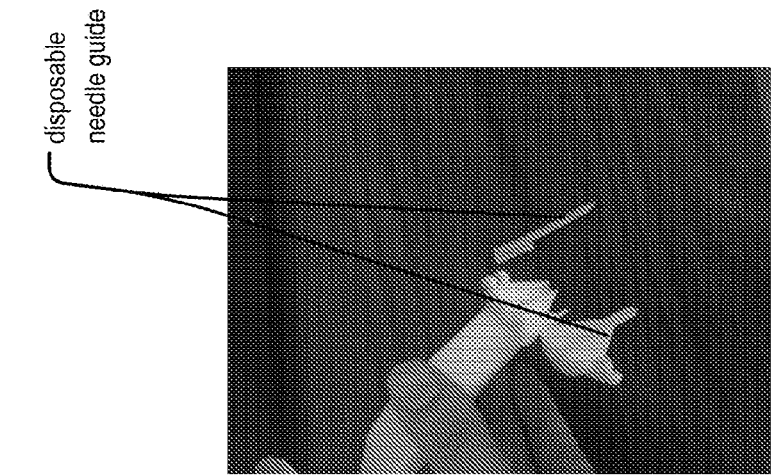
FIG. 10C is an image of a hardware component of an arthrography system, according to an exemplary embodiment of the present disclosure.
Figure 10B:
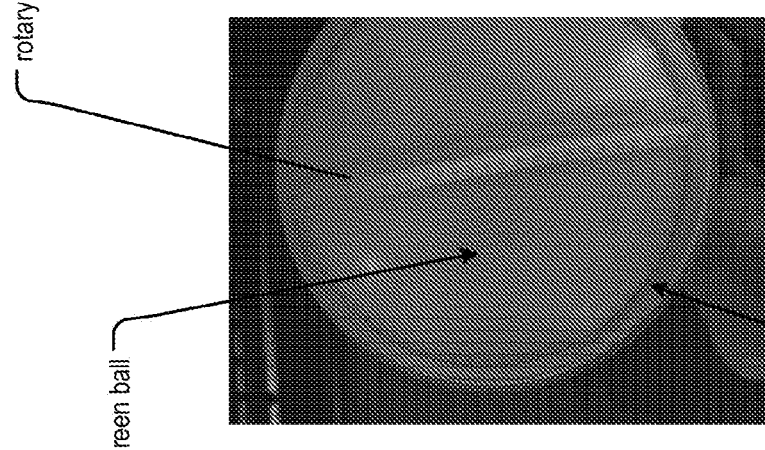
FIG. 10B is an image of a hardware component of an arthrography system, according to an exemplary embodiment of the present disclosure.
Figure 10A:
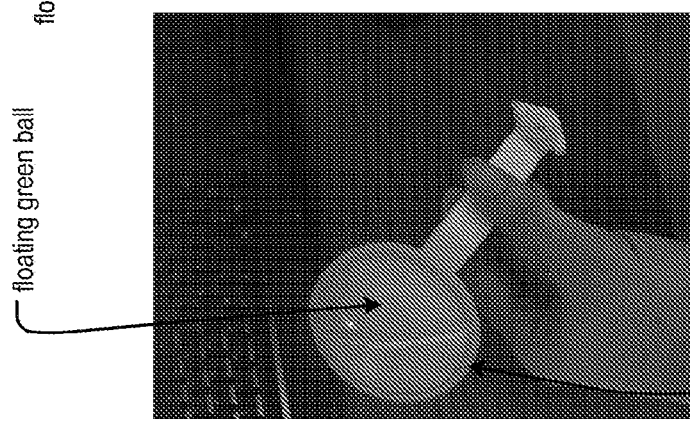
FIG. 10A is an image of a hardware component of an arthrography system, according to an exemplary embodiment of the present disclosure.

According to an embodiment, the NGTk of the present disclosure may be hand-held device according to FIG. 10A through FIG. 10C. As in the images of FIG. 10A and FIG. 10B, the NGTk may include a floating green ball within a spherical component that allows for increased angulation. Moreover, a rotary piece on the spherical component allows for adjustment of the angle of the indicator such that alignment of the floating green ball ensures appropriate alignment of the needle relative to the joint of the patient. FIG. 10C is an image of a disposable needle guide of the NGTk. The disposable need guide, in an embodiment, can include two halves that are attachable to the body-like inset using T-shape slots. In this way, the NGTk can be released from the needle by way of the separable halves.

Figure 11:
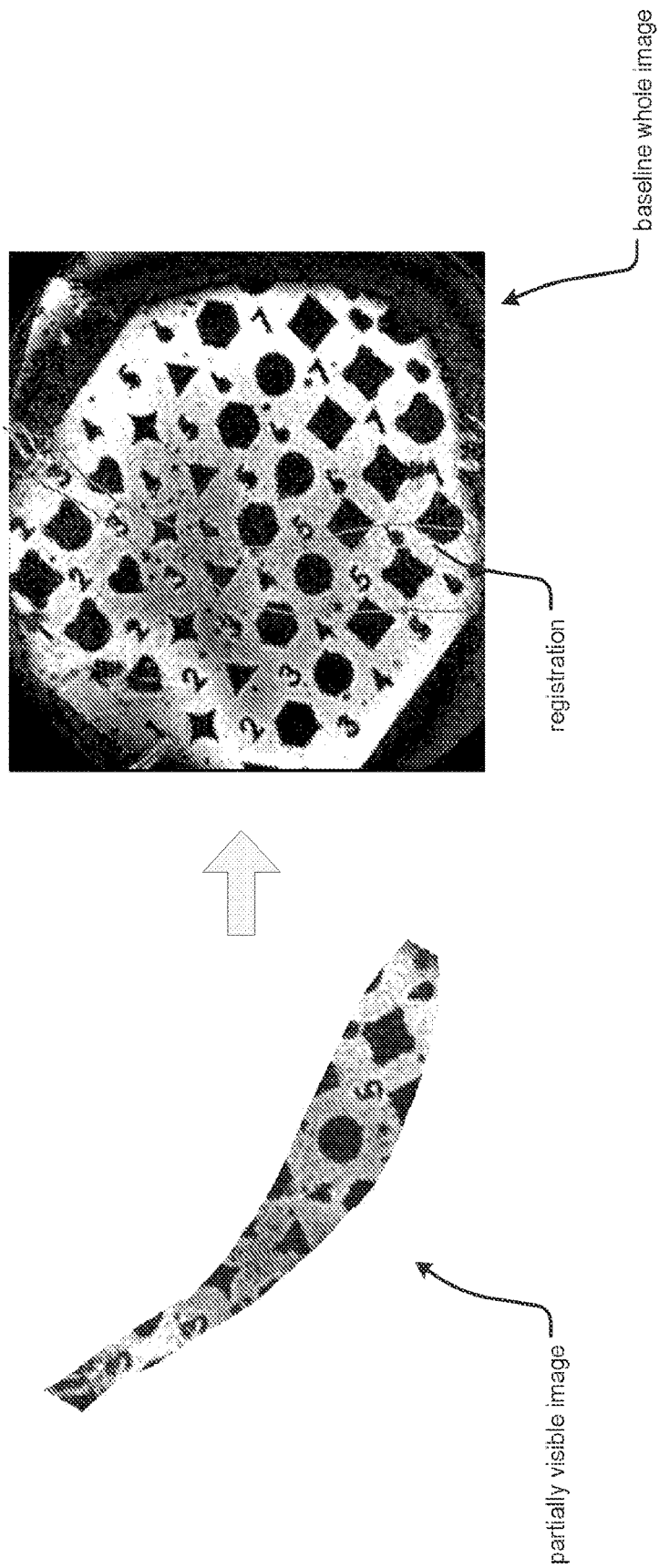
FIG. 11 is an illustration of steps of a software component of an arthrography system, according to an exemplary embodiment of the present disclosure.

According to an embodiment, the NGTk of the present disclosure may include a software component, steps of which are shown in the images of FIG. 11. In an embodiment, the images of FIG. 11 demonstrate an image processing of the present disclosure. The image processing may include, when given a partially visible image of the reference grid, registering the partially visible image with a baseline whole image of the reference grid. This allows for easier identification of the entry point on the physical image using only the partially visible image of the reference grid.

Figure 12A:
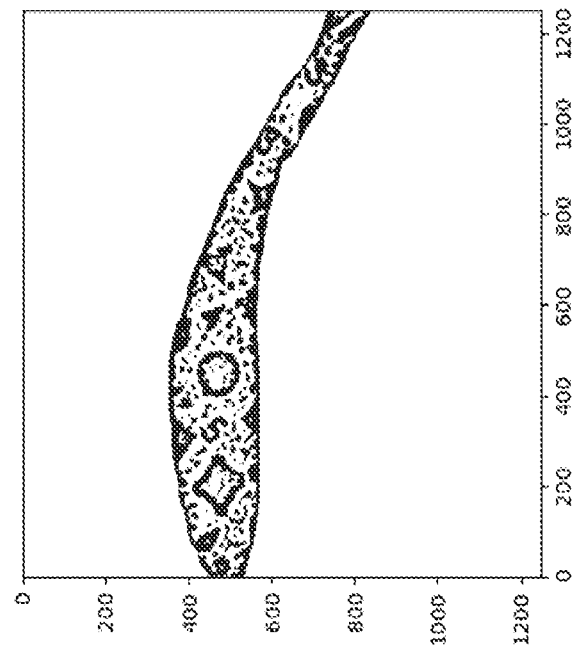
FIG. 12A is an illustration of a step of a software component of an arthrography system, according to an exemplary embodiment of the present disclosure.

Considering the baseline whole image from FIG. 11, FIG. 12A is an image graphically illustrating a baseline image after applying a noise filter and an edge detecting tool. Considering the partially visible image from FIG. 11, FIG. 12B is an image graphically illustrating a partial image after applying a noise filter and an edge detecting tool.

Figure 12B:
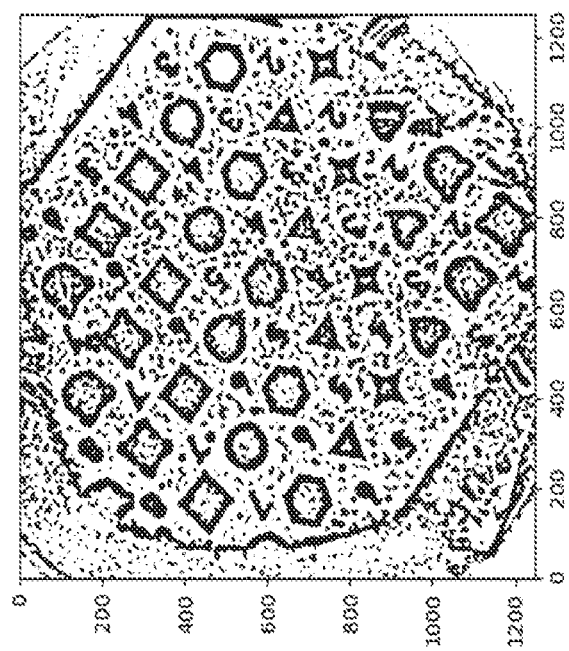
FIG. 12B is an illustration of a step of a software component of an arthrography system, according to an exemplary embodiment of the present disclosure.
Figure 13B:
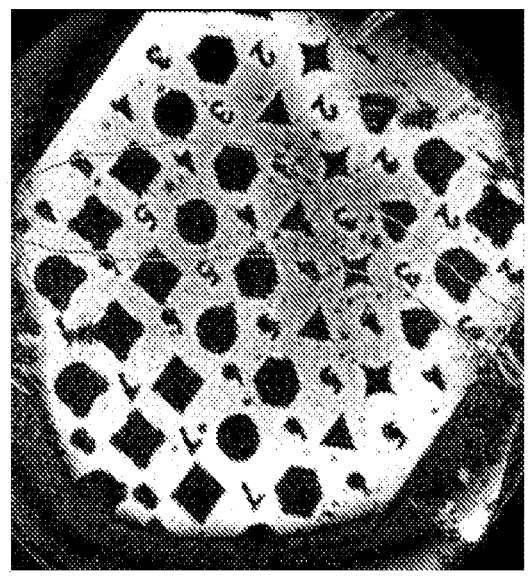
FIG. 13B is an illustration of a step of a software component of an arthrography system, according to an exemplary embodiment of the present disclosure.
Figure 13A:
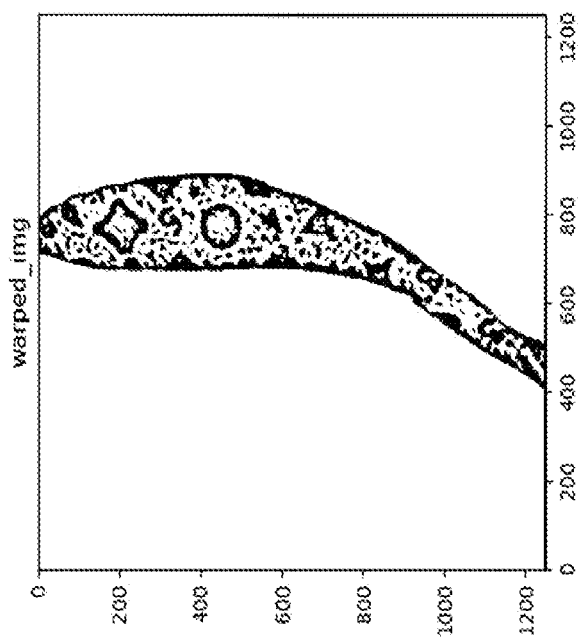
FIG. 13A is an illustration of a step of a software component of an arthrography system, according to an exemplary embodiment of the present disclosure.

Considering the partially visible image from FIG. 11 and FIG. 12B, FIG. 13A is an image of a graphical illustration of a partially visible image after registration and alignment with respect to a baseline whole image. Further, FIG. 13B is an image illustrating integration of the partially visible image and the baseline whole image following registration, the lines extending from the bottom to the top of the image indicating the overlay of the edges of the partially visible image within the baseline whole image.

According to an embodiment, the present disclosure may be considered in view of joint arthrography and other image-guided procedures that involve percutaneous needle insertion. These procedures would include arthrography of the shoulder and other joints, including knee, hip, and ankle, biopsy of multiple sites, drainages, and other interventional procedures. In an embodiment, the NGTk may be developed for use in the closed bore of the conventional MRI environment, thus enabling these procedures. In an embodiment, the present disclosure may also be an enabling tool for computed tomography-guided procedures, as the grid is visible both in MRI and computed tomography.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A system for performing arthrography, comprising a physical grid positioned on skin of a patient proximate a region of interest of a joint on which the arthrography is to be performed, the physical grid being flexible, non-magnetic and including non-repeating features as features of the physical grid, and processing circuitry configured to receive medical images of the patient, the received medical images being acquired by a same imaging modality and having visible a portion of the physical grid, determine a trajectory between an entry point identified on the physical grid and a target point identified within the region of interest of the joint, the identified entry point and the identified target point being identified within the received medical images of the patient, and generate a target entry angle based on the determined trajectory between the identified entry point and the identified target point, wherein a needle guide device, configured to releasably-hold a needle, is positionable according to the identified entry point and the target entry angle such that the needle is deliverable to the region of interest of the joint along the determined trajectory.

(2) The system according to (1), wherein the needle guide device is movably-coupled to one or more inclinometers configured to determine angulation within orthogonal planes.

(3) The system according to either (1) or (2), wherein the needle guide device is moveably-coupled to a stabilizer arm.

(4) The system according to any one of (1) to (3), wherein the non-repeating features include a combination of shapes and numbers.

(5) The system according to any one of (1) to (4), wherein the non-repeating features are voids within the physical grid, the physical grid being visible via magnetic resonance imaging and/or radiography.

(6) The system according to any one of (1) to (5), wherein the physical grid is biocompatible and sterilizable, allowing the needle to be delivered to the patient through regions of the physical grid defined by the features.

(7) The system according to any one of (1) to (6), wherein the processing circuitry is further configured to receive an instruction corresponding to the identified entry point and to the target point identified within the region of interest of the joint, the target entry angle being generated based upon the received instruction.

(8) The system according to any one of (1) to (7), wherein the processing circuitry is further configured to confirm a position of the needle relative to the identified target point and the determined trajectory.

(9) A method for performing arthrography, comprising receiving, by processing circuitry, medical images of a patient, the received medical images being acquired by a same imaging modality and having visible a portion of a physical grid positioned on skin of the patient proximate a region of interest of a joint on which the arthrography is to be performed, the physical grid being flexible, non-magnetic and including non-repeating features as features of the physical grid, determining, by the processing circuitry, a trajectory between an entry point identified on the physical grid and a target point identified within the region of interest of the joint, the identified entry point and the identified target point being identified within the received medical images of the patient, and generating, by the processing circuitry, a target entry angle based on the determined trajectory between the identified entry point and the identified target point, wherein a needle guide device, configured to releasably-hold a needle, is positionable according to the identified entry point and the target entry angle such that the needle is deliverable to the region of interest of the joint along the determined trajectory, and the non-repeating features of the physical grid include combinations of shapes and numbers.

(10) The method according to (9), further comprising receive an instruction corresponding to the identified entry point and to the target point identified within the region of interest of the joint, the target entry angle being generated based upon the received instruction.

(11) The method according to either (9) or (10), further comprising confirm a position of the needle relative to the identified target point and the determined trajectory.

(12) A device for performing arthrography, comprising processing circuitry configured to receive medical images of a patient, the received medical images being acquired by a same imaging modality and having visible a portion of a physical grid positioned on skin of the patient proximate a region of interest of a joint on which the arthrography is to be performed, the physical grid being flexible, non-magnetic, and including non-repeating features as features of the physical grid, determine a trajectory between an entry point identified on the physical grid and a target point identified within the region of interest of the joint, the identified entry point and the identified target point being identified within the received medical images of the patient, and generate a target entry angle based on the determined trajectory between the identified entry point and the identified target point, wherein a needle guide device, configured to releasably-hold a needle, is positionable according to the identified entry point and the target entry angle such that the needle is deliverable to the region of interest of the joint along the determined trajectory.

(13) The device according to (12), wherein the identified entry point is identified in relation to features of the physical grid.

(14) The device according to either (12) or (13), wherein the needle guide device is movably-coupled to one or more inclinometers configured to determine angulation within orthogonal planes.

(15) The device according to any one of (12) to (14), wherein the needle guide device is moveably-coupled to a stabilizer arm.

(16) The device according to any one of (12) to (15), wherein the non-repeating features include a combination of shapes and numbers.

(17) The device according to any one of (12) to (16), wherein the non-repeating features are voids within the physical grid, the physical grid being visible via magnetic resonance imaging and/or radiography.

(18) The device according to any one of (12) to (17), wherein the physical grid is biocompatible and sterilizable, allowing the needle to be delivered to the patient through regions of the physical grid defined by the features.

(19) The device according to any one of (12) to (18), wherein the processing circuitry is further configured to receive an instruction corresponding to the identified entry point and to the target point identified within the region of interest of the joint, the target entry angle being generated based upon the received instruction.

(20) The device according to any one of (12) to (19), wherein the processing circuitry is further configured to confirm a position of the needle relative to the identified target point and the determined trajectory.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for performing arthrography, comprising:
 a needle guide device;
 a physical grid positioned on skin of a patient proximate a region of interest of a joint on which the arthrography is to be performed, the physical grid being flexible, non-magnetic and including non-repeating entry point shapes as features of the physical grid, the non-repeating entry point shapes not repeating in an entire row or in an entire column of the physical grid, each row including a plurality of non-repeating entry point shapes; and
 processing circuitry configured to
  receive medical images of the patient, the received medical images being acquired by a same imaging modality and having visible a portion of the physical grid,
  determine a trajectory between an entry point, corresponding to an entry point shape of the non-repeating entry point shapes, identified on the physical grid and a target point identified within the region of interest of the joint, the identified entry point and the identified target point being identified within the received medical images of the patient, and
  generate a target entry angle based on the determined trajectory between the identified entry point and the identified target point,
 wherein the needle guide device, configured to releasably-hold a needle, is positionable according to the identified entry point and the target entry angle such that the needle is deliverable to the region of interest of the joint along the determined trajectory, and
 wherein every non-repeating entry point shape repeats on a diagonal in the physical grid such that in each column a particular entry point shape is on a different adjacent row and the diagonal only includes entry shapes that are repeating on the diagonal.

2. The system according to claim 1, wherein the needle guide device is movably-coupled to a stabilizer arm or to one or more inclinometers configured to determine angulation within orthogonal planes.

3. The system according to claim 1, wherein the physical grid further includes numbers in addition to non-repeating entry point shapes.

4. The system according to claim 1, wherein the non-repeating features are voids within the physical grid, the physical grid being visible via magnetic resonance imaging and/or radiography.

5. The system according to claim 1, wherein the physical grid is biocompatible and sterilizable, allowing the needle to be delivered to the patient through regions of the physical grid defined by the features.

6. The system according to claim 1, wherein the processing circuitry is further configured to
receive an instruction corresponding to the identified entry point and to the target point identified within the region of interest of the joint, the target entry angle being generated based upon the received instruction.

7. The system according to claim 1, wherein the processing circuitry is further configured to
confirm a position of the needle relative to the identified target point and the determined trajectory.

8. A method for performing arthrography, comprising:
receiving, by processing circuitry, medical images of a patient, the received medical images being acquired by a same imaging modality and having visible a portion of a physical grid positioned on skin of the patient proximate a region of interest of a joint on which the arthrography is to be performed, the physical grid being flexible, non-magnetic and including non-repeating entry point shapes as features of the physical grid, the non-repeating entry point shapes not repeating in an entire row or in an entire column of the physical grid, each row including a plurality of non-repeating entry point shapes;
determining, by the processing circuitry, a trajectory between an entry point, corresponding to an entry point shape of the non-repeating entry point shapes, identified on the physical grid and a target point identified within the region of interest of the joint, the identified entry point and the identified target point being identified within the received medical images of the patient;
generating, by the processing circuitry, a target entry angle based on the determined trajectory between the identified entry point and the identified target point; and
instructing positioning of a needle guide device, configured to releasably-hold a needle, according to the identified entry point and the target entry angle such that the needle is deliverable to the region of interest of the joint along the determined trajectory,
wherein the physical grid further includes numbers in addition to non-repeating entry point shapes, and
wherein every non-repeating entry point shape repeats on a diagonal in the physical grid such that in each column a particular entry point shape is on a different adjacent row and the diagonal only includes entry shapes that are repeating on the diagonal.

9. The method according to claim 8, further comprising receiving an instruction corresponding to the identified entry point and to the target point identified within the region of interest of the joint, the target entry angle being generated based upon the received instruction.

10. The method according to claim 8, further comprising confirming a position of the needle relative to the identified target point and the determined trajectory.

11. A device for performing arthrography, comprising:
a needle guide device; and
processing circuitry configured to
receive medical images of a patient, the received medical images being acquired by a same imaging modality and having visible a portion of a physical grid positioned on skin of the patient proximate a region of interest of a joint on which the arthrography is to be performed, the physical grid being flexible, non-magnetic, and including non-repeating entry point shapes as features of the physical grid, the non-repeating entry point shapes not repeating in an entire row or in an entire column of the physical grid, each row including a plurality of non-repeating entry point shapes,
determine a trajectory between an entry point, corresponding to an entry point shape of the non-repeating entry point shapes, identified on the physical grid and a target point identified within the region of interest of the joint, the identified entry point and the identified target point being identified within the received medical images of the patient, and
generate a target entry angle based on the determined trajectory between the identified entry point and the identified target point,
wherein the needle guide device, configured to releasably-hold a needle, is positionable according to the identified entry point and the target entry angle such that the needle is deliverable to the region of interest of the joint along the determined trajectory, and
wherein every non-repeating entry point shape repeats on a diagonal in the physical grid such that in each column a particular entry point shape is on a different adjacent row and the diagonal only includes entry shapes that are repeating on the diagonal.

12. The device according to claim 11, wherein the identified entry point is identified in relation to the features of the physical grid.

13. The device according to claim 11, wherein the needle guide device is movably-coupled to one or more inclinometers configured to determine angulation within orthogonal planes.

14. The device according to claim 11, wherein the needle guide device is moveably-coupled to a stabilizer arm.

15. The device according to claim 11, wherein the physical grid further includes numbers in addition to non-repeating entry point shapes.

16. The device according to claim 11, wherein the non-repeating features are voids within the physical grid, the physical grid being visible via magnetic resonance imaging and/or radiography.

17. The device according to claim 11, wherein the physical grid is biocompatible and sterilizable, allowing the needle to be delivered to the patient through regions of the physical grid defined by the features.

18. The device according to claim 11, wherein the processing circuitry is further configured to
receive an instruction corresponding to the identified entry point and to the target point identified within the region of interest of the joint, the target entry angle being generated based upon the received instruction.

19. The device according to claim 11, wherein the processing circuitry is further configured to
confirm a position of the needle relative to the identified target point and the determined trajectory.

* * * * *